United States Patent

Watson

[11] 3,903,568
[45] Sept. 9, 1975

[54] PRODUCTION OF BATTING

[75] Inventor: George A. Watson, Davidson, N.C.

[73] Assignee: Celanese Corporation, New York, N.Y.

[22] Filed: July 3, 1973

[21] Appl. No.: 376,252

Related U.S. Application Data

[60] Division of Ser. No. 116,046, Feb. 17, 1971, Pat. No. 3,747,162, which is a division of Ser. No. 37,416, May 13, 1970, Pat. No. 3,660,867, which is a continuation of Ser. No. 568,877, July 29, 1966, abandoned.

[52] U.S. Cl. ............................................. 19/163
[51] Int. Cl.² ....................................... D04H 11/04
[58] Field of Search .................. 19/163, 160, 65 T; 156/62.4, 62.6, 444, 440; 425/80

[56] References Cited
UNITED STATES PATENTS
2,736,362  2/1956  Slayter et al. ............... 156/62.4 X FOREIGN PATENTS OR APPLICATIONS
961,775  6/1964  United Kingdom ............... 19/160
619,039  3/1961  Italy ............................... 19/163
154,366  4/1964  U.S.S.R. ........................... 19/163

*Primary Examiner*—Dorsey Newton

[57] ABSTRACT

Apparatus for the manufacture of cross-lapped structures is provided comprising means for continuously supplying a web, a support, means for traversing the web, the traversing means including an oscillating chute for receiving and discharging the web onto the support, the chute comprising opposed wide panels converging toward an exit, means for oscillating the chute, the chute exit being spaced from the support sufficiently for the web to billow outward, the chute having attached thereto baffle means to regulate and direct the currents of air generated by the oscillation of the chute.

1 Claim, 24 Drawing Figures

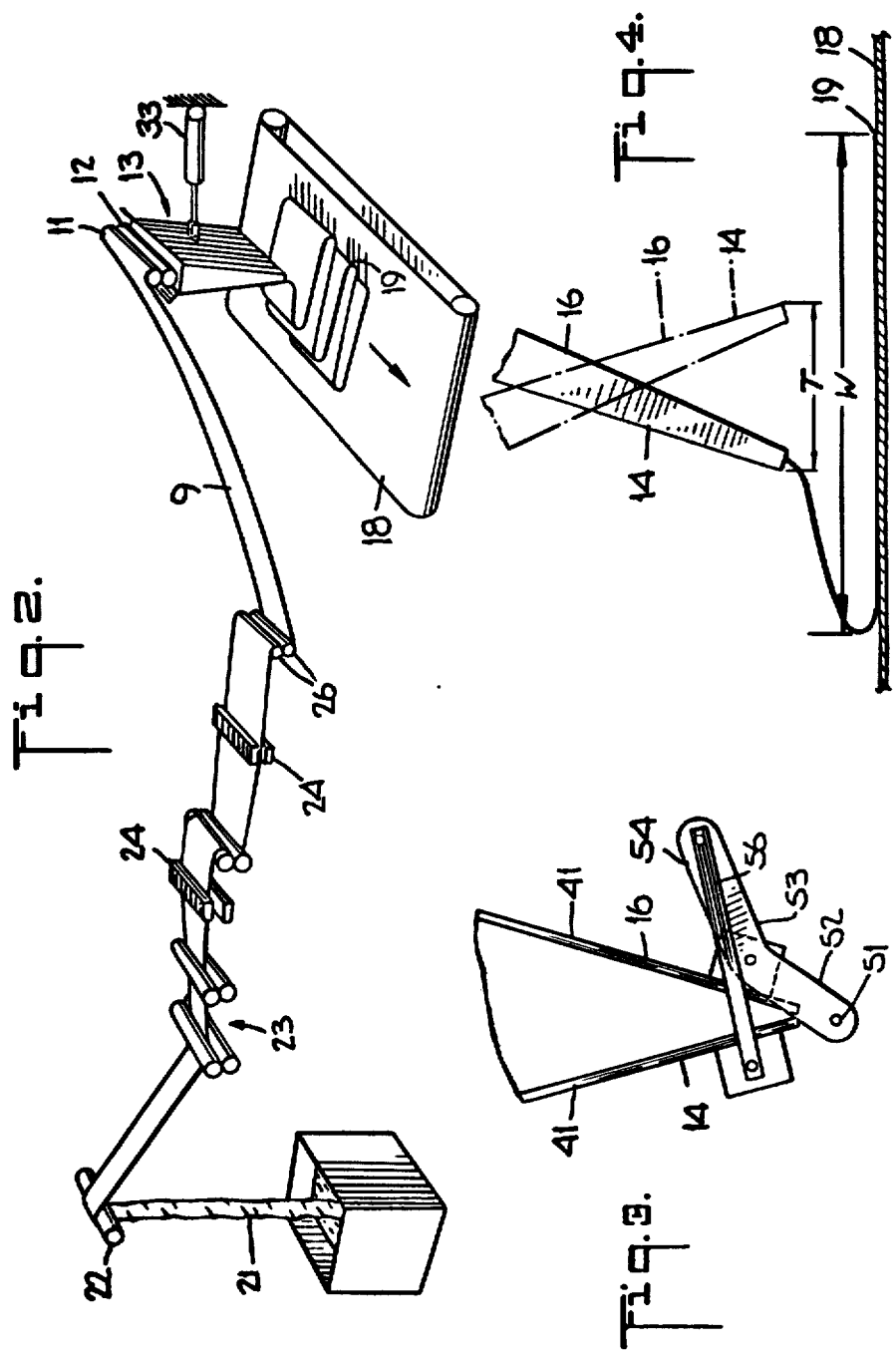

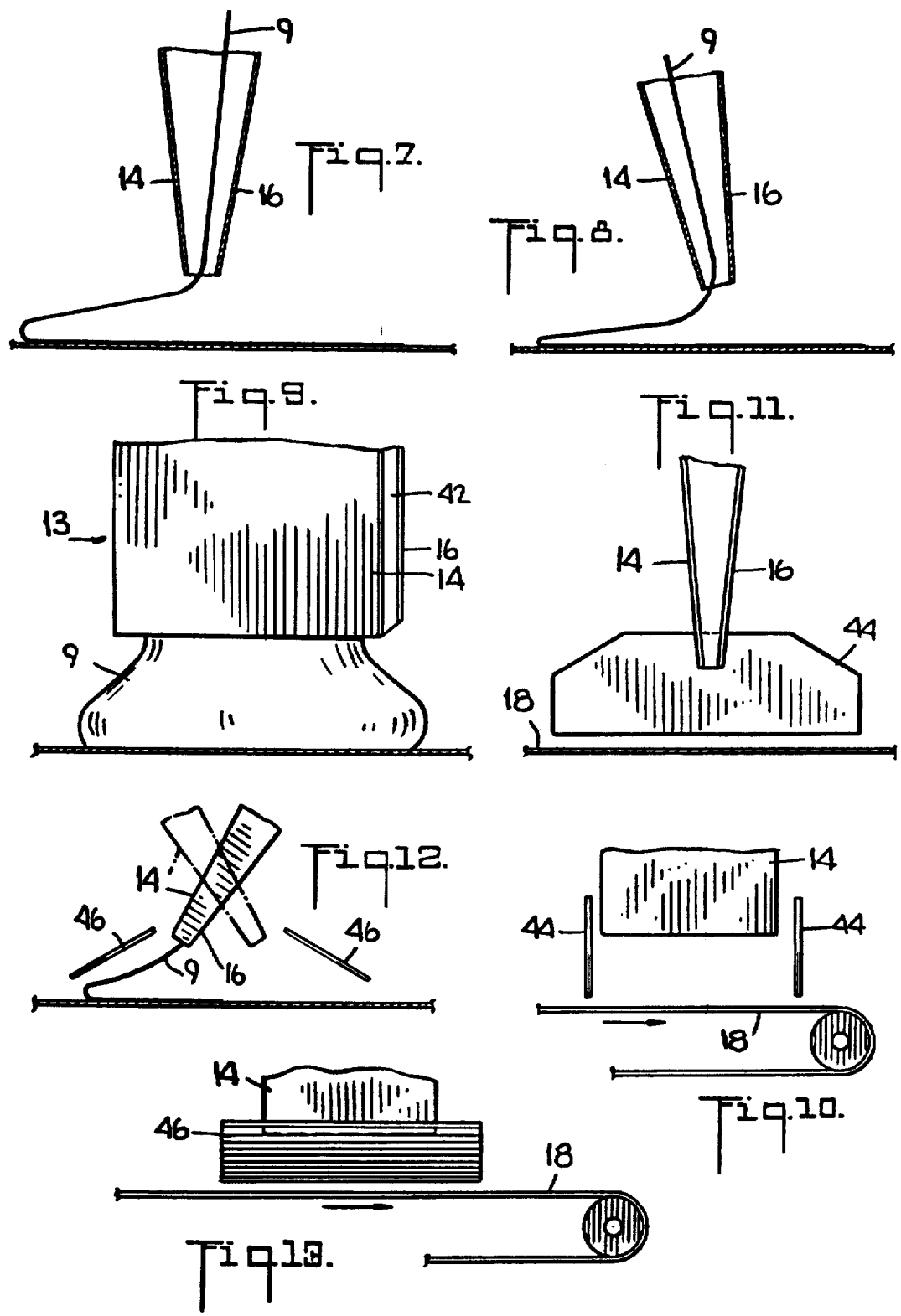

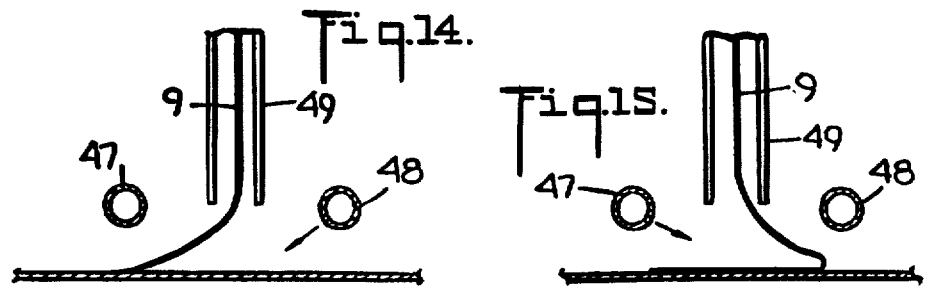
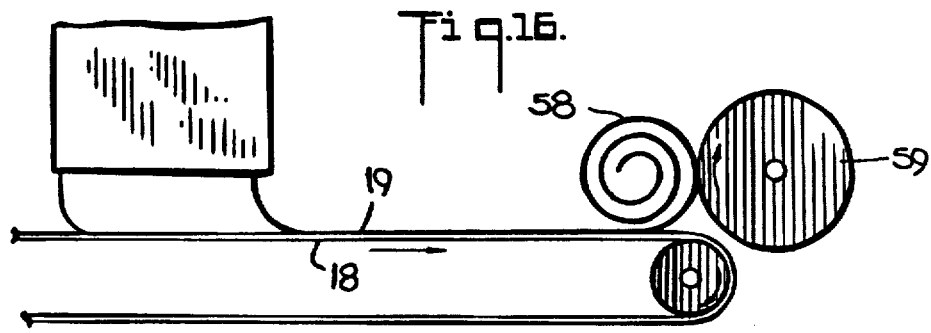
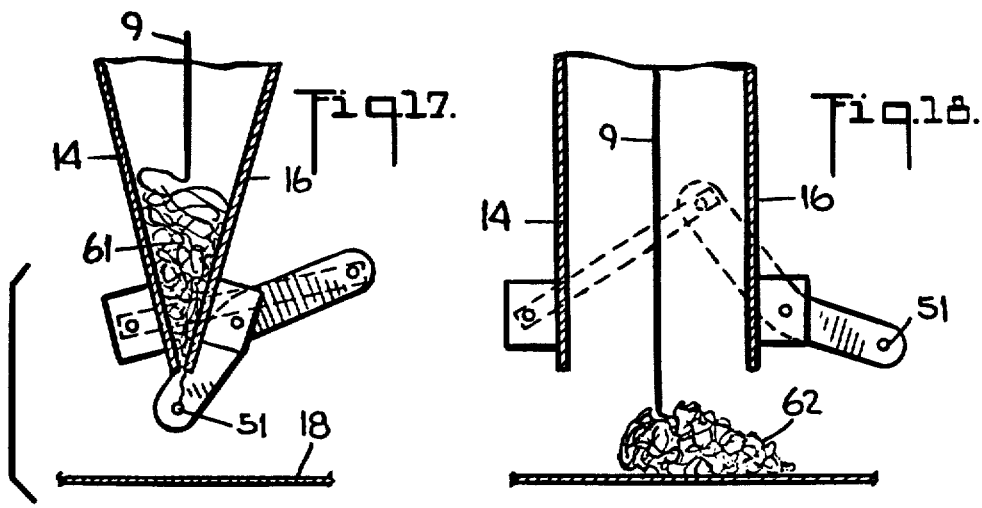

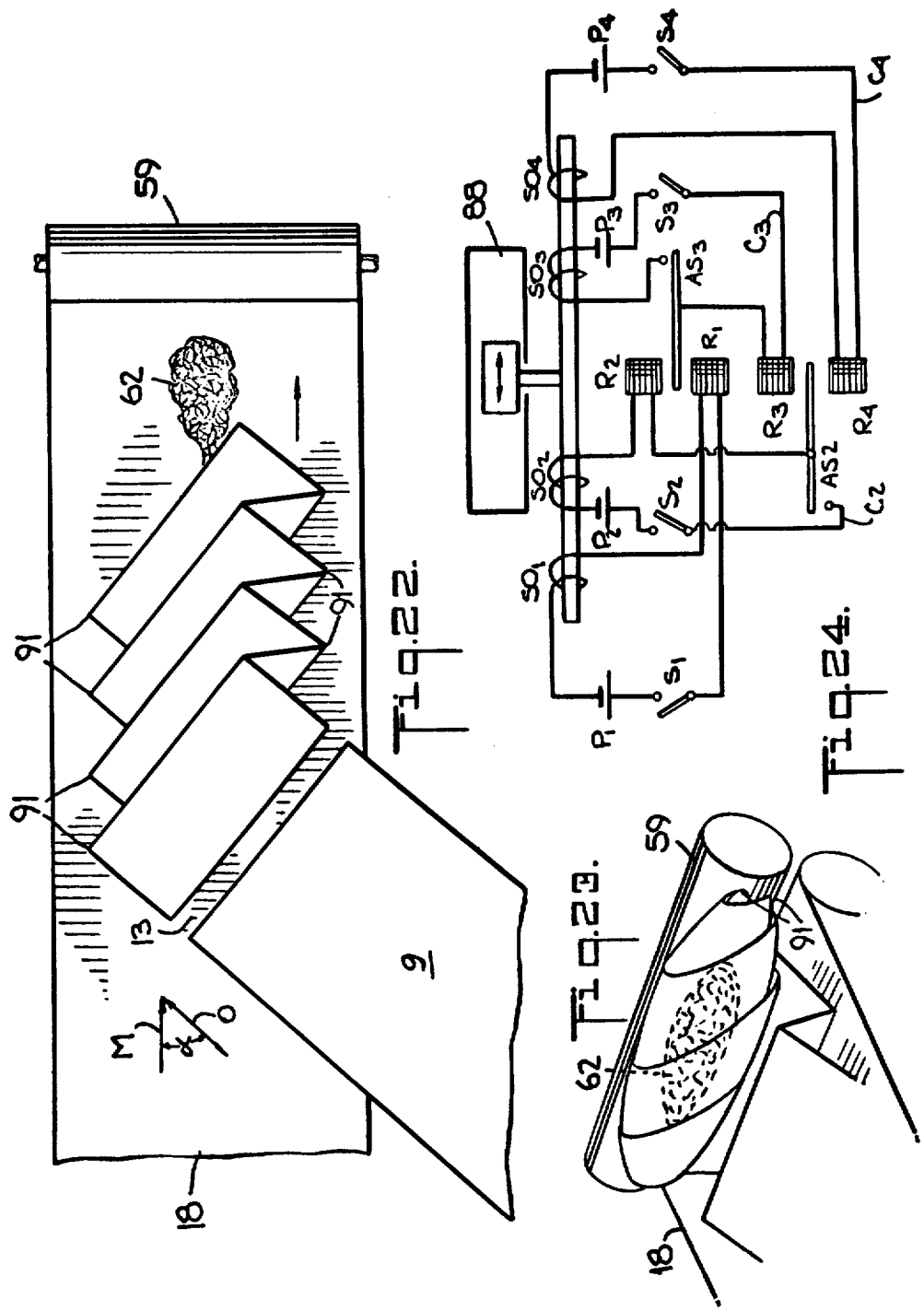

PRODUCTION OF BATTING

This application is a division of application Ser. No. 116,046 filed Feb. 17, 1971, now U.S. Pat. No. 3,747,162, which application is a division of application Ser. No. 37,416 filed May 13, 1970, now U.S. Pat. No. 3,660,867, which application is a continuation of U.S. application Ser. No. 568,877, filed July 29, 1966, now abandoned.

This invention relates to the production of batting materials and pillows.

One object of this invention is to provide novel, economical, and highly effective methods for the cross-lapping of fine webs of substantially parallel continuous filaments.

Other objects of this invention will be apparent from the following detailed description and claims.

The invention finds its greatest utility in the handling of fine, diaphanous, limp, cohesive spread webs of substantially parallel crimped continuous filaments, as described, for example, in Belgian Pat. No. 656,031 (and corresponding African patent application 64/5387).

Certain aspects of this invention are illustrated in the accompanying drawings, in which FIG. 1 is a schematic perspective view of a portion of a cross-lapping apparatus.

FIG. 2 is a schematic perspective view showing a tow opening and spreading operation for supplying a wide web of crimped, substantially parallel continuous filaments to a cross-lapping operation.

FIG. 3 is a schematic view in elevation showing a web-cutting device at the exit of a cross-lapping chute.

FIG. 4 is a schematic view in elevation showing the relationship between the traverse of the chute and the width of the cross-lapped batting, and indicating the path of the web leaving the chute.

FIGS. 5, 6, 7 and 8 are schematic views in elevation showing the path of the web in relation to the position of the chute at various times during the traverse movement of the chute.

FIG. 9 is a view in elevation taken at about the same time as that of FIG. 6, but at right angles to the latter.

FIG. 10 is a schematic view in elevation showing a cross-lapping arrangement like that of FIGS. 1–9, modified by the use of baffles.

FIG. 11 is a schematic view in elevation, taken at right angles to FIG. 10.

FIG. 12 is a schematic view in elevation showing a cross-lapping arrangement like that of FIGS. 1–9, modified by the use of certain baffles overlying the ballooning portion of the web.

FIG. 13 is a schematic view in elevation taken at right angles to FIG. 12.

FIGS. 14 and 15 are schematic views in elevation, taken at different times in the traverse cycle and showing an arrangement in which the web is traversed solely by the action of streams of air.

FIG. 16 is a schematic view in elevation showing a method for forming the cross-laid web into a rolled batt.

FIGS. 17 and 18 are schematic views in elevation taken at different stages in a pillow-making operation and showing the formation of a wad of randomly folded material.

FIG. 19 is a cross-sectional view of a rolled cross-lapped batt having a central wad of randomly folded material.

FIG. 22 is a schematic plan view of the operation of a cross-lapping device useful for making tapered batts and in which the traverse motion is at an acute angle to the direction of movement of the cross-lapped batting.

FIG. 23 is a perspective view of the rolling of a tapered pillow batting made by using the apparatus shown in FIG. 22, including a phantom view of the crumpled core; and FIG. 24 is a schematic diagram of an electric circuit for controlling the cross-lapping operation illustrated in FIG. 21.

Figure 1:
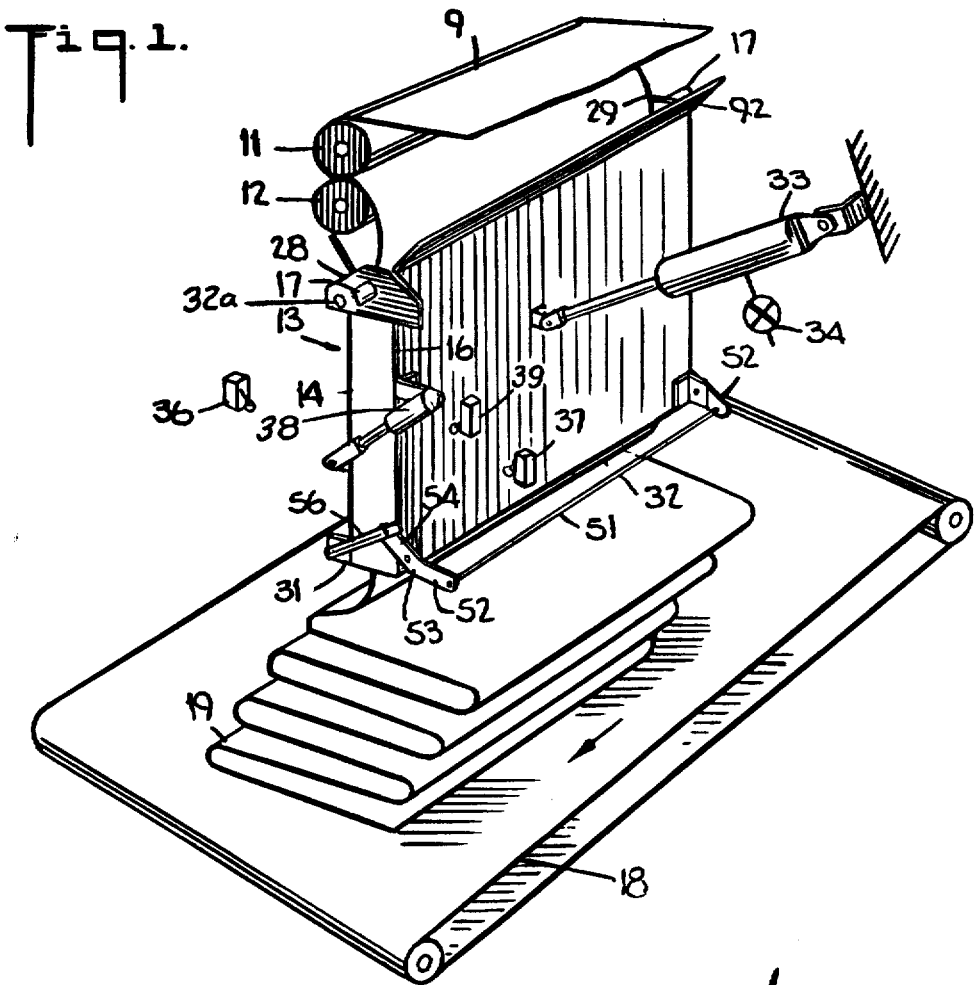

Referring to FIG. 1, a wide, spread web 9 of deregistered crimped substantially parallel continuous filaments is supplied continuously to a pair of feed rolls 11 and 12, and drop down from the feed rolls into a wide pivoted chute 13 made up of a pair of relatively closely spaced rigid panels or "doors" 14 and 16 which are mounted for oscillating, swinging, movement together about a pivotal axis 17. The web passes downward between the doors 14 and 16 and is distributed, by their oscillating action, back and forth across a continuously moving apron 18 (which is preferably a driven endless belt) to form a cross-lapped batting 19.

The wide web 9, which may be 50 inches wide for example, may be produced from a crimped tow 21 (FIG. 2) of a great many (e.g., 30,000) continuous filaments, by passing the tow through a banding device 22, a threaded roll device 23 where the crimps of adjacent filaments are deregistered, and a series of air spreaders 24, after which the spread web passes between a pair of driven delivery rolls 26 (about which it makes an S-wrap). The foregoing procedure is described in detail in the previously mentioned Belgian patent.

From the delivery rolls 26, the web passes upward to the rolls 11, 12, which rotate continuously at a predetermined constant, and equal, speed; which is about the same (measured linearly) as the speed of the delivery rolls 26. Preferably one of the feed rolls is axially driven while the second feed roll is pressed against the first roll and is frictionally surface-driven thereby. The feed rolls may be arranged one above the other so that the web makes an S-wrap around the rolls (as shown in FIG. 1) or they may be arranged side-by-side.

The two doors 14 and 16 making up the chute 13 are supported at their upper ends by brackets 28 and 29 arranged to pivot about the horizontal axis 17, the mounting being such that the lower edges 31 and 32 of these doors can be brought together, when desired, to block the downward movement of tow between the doors. To this end one door 16 may be fixed to the brackets 28, 29, and the other door 14 may be pivotally connected to the brackets, at pin 32a, for limited relative movement, so as to "open" and "close" the bottom of the chute. The unitary oscillating movement of the two doors may be effected in any suitable manner, as by means of a pneumatic or hydraulic cylinder 33, the flow of fluid to the cylinder being regularly reversed by a suitable valve 34 controlled in turn by adjustably mounted limit switches 36, 37 which are engaged by laterally extending projections on the doors; thus, when the doors reach the predetermined limit of their swing in either direction a limit switch 36 or 37 is tripped by one of these projections, causing the piston of the cylinder 33 to reverse its direction of movement. To open and close the bottom of the chute there may be another switch 39 to control hydraulic cylinder 38 mounted on one of the doors and controlled by a preset adjustable timing switch (not shown).

The inner walls of the chute preferably have smooth surfaces over which the diaphanous web can slide easily without its filaments being caught or snagged. Thus, the inner walls of the doors may be faced with sheets 41 (FIG. 3) of flexible clear plastic, e.g., cellulose acetate, polyethylene, etc. To control the movement of the web, the side edges of the chute may be blocked off; thus the adjacent edges of the doors may be joined by end pieces 42 (FIG. 9) of textile fabric or plastic film.

Figure 5:
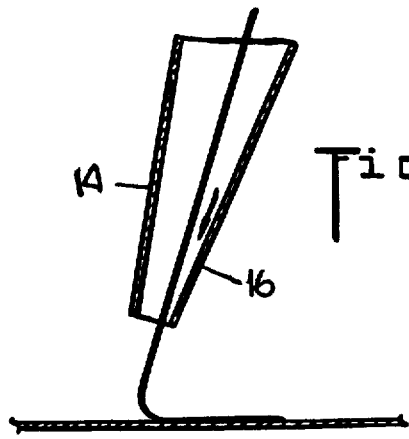
Figure 6:
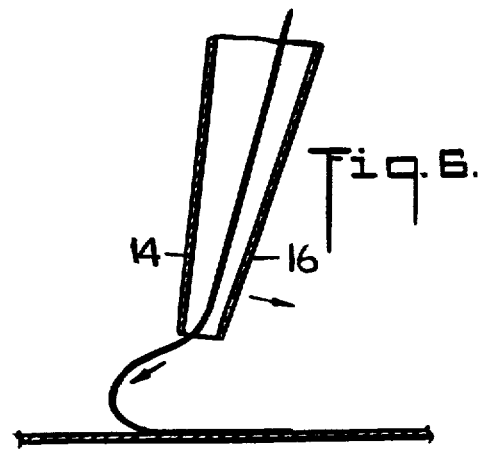

The use of the chute 13 makes it possible to produce battings whose width "W" (FIG. 4) is considerably greater than the traverse distance "T" of the lower ends of the doors. For example, battings about 84 inches wide have been produced readily even though the traverse distance is only about 48 inches. This effect is particularly noticeable when the web is fed at a high speed. While not wishing to be bound by any particular explanation, it is believed that this effect can be attributed to the air currents generated in the operation of the device. This is illustrated in FIGS. 5 and 6. FIG. 5 shows the position as the doors stop at the extreme leftward limit of their swing; the arrow in that FIG. 5 indicates the current of air generated by the rapid movement of the downwardly falling web 9. As indicated, there is little if any contact between the web and the walls of the chute 13; thus, the right hand door, in pushing the web to the left, generally does not act directly on the web, but instead acts indirectly, through a cushion of air. FIG. 6 shows the position just after the chute has started to swing to the right. As indicated by the lower arrow in FIG. 6, the previously generated current of air is partially trapped under the diaphanous still-falling web and causes it to billow out further to the left; the upper arrow in FIG. 6 indicates that the rightward swing of the chute generates another current of air that may also become partially trapped under the web and aid in the billowing effect. Smoke tests show that even after the chute has begun its rightward swing there is a definite gentle current of air moving to the left near the surface of the apron at the left edge of the apron. The billowing effect not only throws the web further than the traverse distance but also causes it to spread laterally, so that it widens after it leaves the bottom of the chute as illustrated in FIG. 9.

Further movement of the chute toward the right overcomes the leftward billowing effect and causes the web to be laid down onto the apron, as illustrated in FIGS. 7 and 8.

For best results the web is supplied at a linear speed which is appreciably greater than the speed of the traverse. That is, in the time that the traverse makes a complete cycle, travelling a distance equal to $2T$ (see FIG. 4), there is supplied a length of web equal or greater than $2W$. The web speed is generally at least 10% greater than the traverse speed, and preferably at least about 30% greater than the traverse speed.

It is within the scope of this invention to provide suitable baffle means to regulate and direct the currents of air so as to control the billowing effect. Thus, there may be upright stationary baffles 44 (FIGS. 10 and 11) flanking the edges of the bottom of the chute above the apron, or inclined stationary baffles 46 (FIGS. 12 and 13) positioned to overlie the billowing web at each side of the traverse, or both types of baffles may be used together. Also it is within the broader scope of the invention to effect the cross-lapping by means of alternately operating air streams, as by the use of two air headers 47, 48 (FIGS. 14 and 15) each extending across the width of the web 9 which is being delivered from a non-traversing stationary chute 49, the air supply to both headers being controlled (as by an adjustable timer-operated switching valve) so that a controlled stream of air is blown first from one header 48 under the web 9 to cause it to billow out to one side, over the moving apron (FIG. 14) after which the air supply to the header 48 is shut off and the air is furnished to header 47 to cause the web to billow out in the other direction (FIG. 15); the stationary chute 49 may be opened and closed at its bottom in the same manner as previously indicated in the description of the moving chute 13.

The invention also includes provision for cutting the web. In the embodiment illustrated in FIGS. 1 to 3, the bottom of the chute 13 carries a web-cutting element adapted to be actuated at about the time the bottom of the chute is closed. More particularly, an electrically heated wire 51 is stretched between the projecting lower arms 52 of two bell cranks 53 mounted on, and at opposite sides of, one door, 16. When the bottom of the chute is open the wire is positioned at the side of the door 16, away from the moving web. The upper arm 54 of one (or both) of the bell cranks 53 is pivoted to a rod 56 attached to the other door 14 so that when the doors move towards each other, during the closing of the bottom of the chute, the hot wire is brought down into contact with the web to sever the latter.

The manufacture of pillows is one important use for cross-lapped battings produced from the spread webs. To form the stuffing of a pillow the cross-lapped material 19 may be rolled up to form a batt 58, as shown in FIG. 16, by means of a driven roll 59 at the discharge end of the apron 18. The device shown in FIGS. 1 to 3, previously discussed, is particularly suitable for making pillow stuffings of novel and advantageous construction. In one suitable cycle of manufacture of such pillow stuffings the bottom of the chute is closed at the start of the cycle, thus cutting the moving web 9 and causing it to pile up in folds 61 (FIG. 17) in the chute. The bottom of the chute is then opened so that a wide mass, or wad, 62, of randomly folded web falls onto the moving apron 18, approximately along the center line of the apron. The chute begins its swinging traverse movement and, for the remainder of the cycle, the web is therefore deposited in cross-lapped folds onto the apron. The bottom of the chute is then closed again, to cut the web and start a new cycle. The movement of the apron carries the web material to a roll-up station where it is brought up against the continuously driven wide roll 59 of relatively large diameter. There is thus formed a rolled-up batt 63 (FIG. 19) having a randomly folded center 64 (the randomly folded material encounters the roll 59 before the cross-lapped portion) surrounded by cross-lapped layers 66, which is then stuffed, either manually or automatically, into an opened pillow tick, after which the open end of the pillow tick is closed, as by sewing. The best pillows are obtained when the general direction of the filaments of the cross-lapped layers 66 is longitudinal of the pillow. It will be understood that the filaments of the cross-lapped batt are not parallel to the long axis of the pillow, but are at an average angle of, for example, in the range of about 10°–30° on both sides of that axis. For example, the filaments of one layer of the cross-lapped batt may be at an average angle of 20° positive to the long axis of the pillow while the filaments of the next layer may be at an average angle of 20° negative to that long axis. The pillows have a much lower tendency to matt than do pillows made of staple fiber batts; each cross-lapped layer of continuous filaments resists penetration by the crossing continuous filaments of the adjacent layers. With staple fibers there is more tendency for interpenetration of the layers. No bonding or stitching of the filaments or layers is needed in the manufacture of pillows according to this invention.

In a typical 15-second cycle for the production of a pillow stuffing batt weighing 20 ounces, the bottom of the chute is closed for 1½ seconds and is open for 13½ seconds while the web is supplied at a constant rate; thus about 10% of the weight (i.e. 1½ divided by 15) of the rolled-up batt will be randomly folded material. The presence of the randomly folded material helps to give the pillow a desirable center crown.

The procedure described above yields pillows of excellent quality at high production rates. The time interval between completion of the rolling of one batt and the beginning of the rolling of the next batt keeps the batts clearly separate and thus facilitates the manual removal of the rolled-up batt from the apron, for insertion into a pillow. Without such batt separation, if the operators (handling the batt-removal and pillow-stuffing operations) fall even slightly behind in their work in a high speed operation, two or more batts can be rolled together inadvertently.

Figure 20:
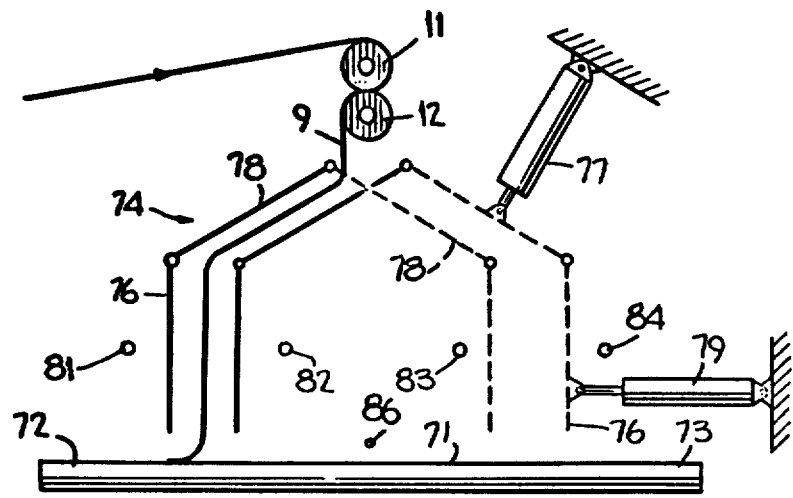
FIG. 20 is a schematic view in elevation of a modified cross-lapping apparatus particularly suitable for the manufacture of pillow batts.

Another procedure for getting good batt separation is illustrated schematically in FIG. 20. Here there are used, alternately, two traverse paths which are effectively disaligned in the direction of the lateral motion of the cross-lapped material. In the embodiment shown in FIG. 20, a double width apron 71 is employed and the web 9 is deposited first on the left half 72 of the apron, in a first traverse path, and then on its right half 73, in a second traverse path. The chute 74 is made up of two articulated sections: a lower, rapid traverse section 76 (which is operated in the same manner as the previously described chute 13, as by the action of a hydraulic or pneumatic cylinder 79), and an upper section 78 adapted to be moved, by the action of a second cylinder 77 from an operating position (shown in solid lines) in which the lower section is over the left half of the apron to a second operating position (shown in broken lines) in which the lower section is over the right half of the apron and vice versa. There are two sets of limit switches 81, 82 and 83, 84 to control the rapid traverse movement at the two operating positions. There is a cutting device, preferably an electrically heated wire 86 positioned at a level below the bottom of the chute 74 and above the middle of the apron 71, to sever the web trailing from the chute during the change in operating position, without any provision being made for closing the bottom of the chute. The entire operation may be controlled by any suitable timing apparatus (not shown) responsive, for example, to the number of rotations of the feed rolls 11, 12. Thus, in one full cycle of operation, the timing apparatus may activate the left hand limit switches 81, 82 and rapid traverse cylinder 77 so that the lower section 76 of the chute oscillates, thus laying a cross-lapped batting; then the limit switches are deactivated, the positioning cylinder 79 is activated to move the chute to the right (causing the web to be cut by the hot-wire) and the right hand limit switches 83, 84 are activated so that a cross-lapped batting is laid on the right hand side of the apron while the batting on the left hand side is being rolled up and stuffed into a pillow. The positioning cylinder 79 is then activated to move the chute to the left, cutting the web again and starting the cycle anew. It will be appreciated that instead of using a double width apron 71, two separate aprons corresponding to portions 72 and 73 may be employed and that these may move in the same direction, as previously described, or in different (e.g., opposite) directions; in either case, the two traverse paths are effectively disaligned in the direction of movement of the aprons.

Figure 21:
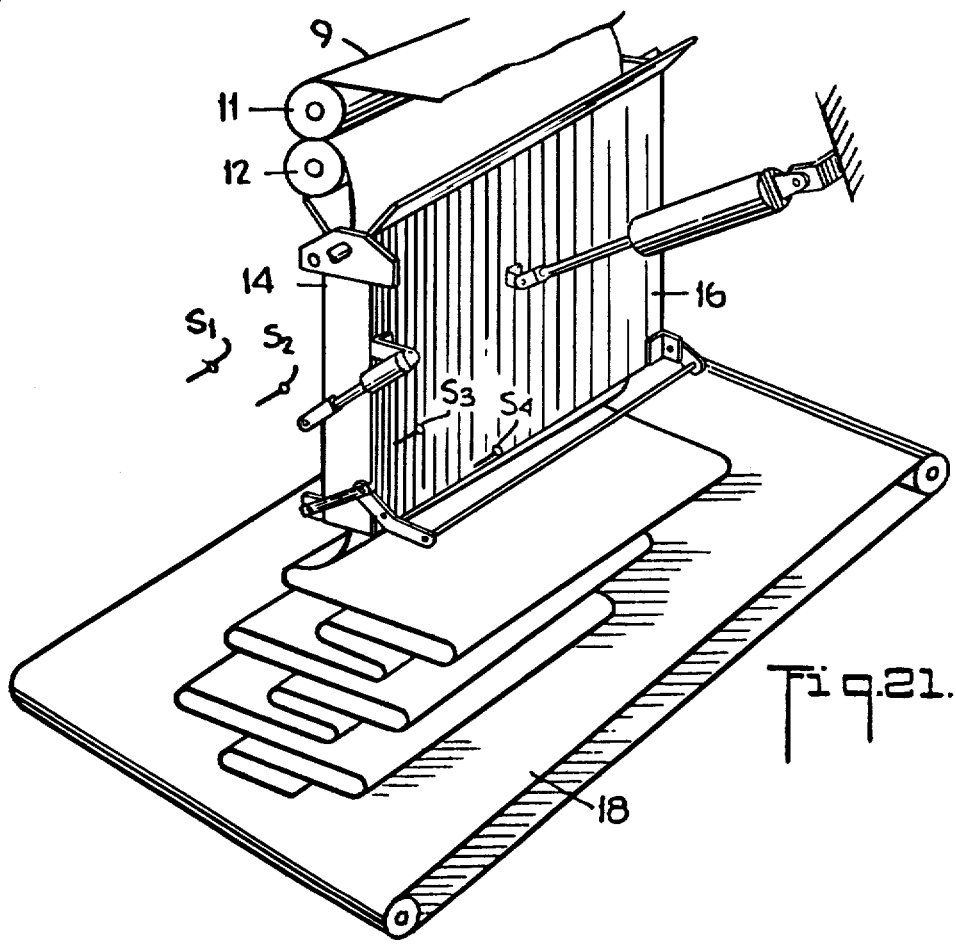
FIG. 21 is a schematic perspective view of the operation of a cross-lapping device useful for making tapered batts and in which the traverse motion is at a right angle to the direction of movement of the cross-lapped batting.

Tapered batts may be produced by modifying the apparatus to make the cross-lapped folds of different lengths so that when the batting is rolled up its ends contain less material than the center. One method of doing this is illustrated in FIG. 21 in which the apparatus is the same as shown in FIG. 1 except that four limit switches S1, S2, S3, S4 are employed. These limit switches may be so connected that the wide swing of the chute is interrupted and reversed intermittently to produce additional cross-lapped folds at the center portion of the swing. For example, in one construction, when the chute swings to the right its contact with switch S3 causes it to reverse its direction before it has made its full rightward swing. It then contacts switch S2 which again reverses the direction of swing so that only a relatively narrow fold is produced. The continued rightward swing of the chute brings it into contact with switch S4 causing it to reverse its direction and swing leftward until it contacts switch S1, whereupon it swings to the right again.

In the construction illustrated in FIG. 24 of the drawing, each switch S1, S2, S3, S4 is part of a circuit C1, C2, C3, C4, respectively, each circuit being connected to a source of electric power P1, P2, P3 or P4 and containing a solenoid SO1, SO2, SO3 or SO4 and a relay R1, R2, R3 or R4. In addition there are auxiliary switches AS2 and AS3 in circuits C2 and C3, respectively.

In operation, when the chute swings to the right it trips switch S3 to closed position and thus closes circuit C3, causing the solenoid SO3 to move the main chute-controlling valve 88 to its reverse position. Closing of circuit C3 also activates relay R3 which closes auxiliary switch AS2 in circuit C2, making the latter ready for activation.

The movement of main valve 88 to its reverse position causes the chute to swing leftward, tripping open the switch S3 (which does not affect the position of the main valve 88).

Next the leftward swing of the chute closes the switch S2 closing the circuit C2 and causing the solenoid SO2 to move the main valve 88 to its forward position, thus causing the chute to swing to the right. Closing of circuit C2 also actuates a relay R2 which opens an auxiliary switch AS3 of circuit C3, inactivating the latter.

The rightward swing of the chute first opens switch S2 (which opening does not affect the position of the main valve), then closes switch S3 (which does not have any activating effect on circuit C3 since auxiliary switch AS3 is open) and, finally, closes switch S4 which closes circuit C4, actuating solenoid SO4 to move the main valve to its reverse position, thus causing the chute to swing to the left. Closing of circuit C4 also actuates a relay R4 which opens an auxiliary switch AS2 in the circuit C2, inactivating the latter.

The resulting leftward swing of the chute first opens switch S4, then opens switch S3 (neither of which now affects the position of the main valve), then closes switch S2 (which does not have any activating effect on circuit C2 since auxiliary switch AS2 is open) and, finally, closes switch S1, thus closing circuit C1 and causing the solenoid SO1 to move the main valve 88 again to its forward position so that the chute is caused to swing to the right. Closing of circuit C1 also actuates a relay R1 which closes the auxiliary switch AS3 in circuit C3 making the latter ready for activation.

The resulting rightward swing of the chute first opens switch S1, then opens switch S2 (neither of which now affects the position of the main switch), then closes switch S3, closing circuit C3 and starting the cycle anew.

A very desirable type of tapered batt may also be attained by placing the apron 18 so that its direction of movement M (FIG. 22) is at an acute angle (e.g., 30°, 45° or 60°) to the direction of traverse 0 of the chute 13 rather than at the 90° angle used in the previous illustrations. The resulting cross-lapped batting is thinner at its edges (where there are exposed corners 91) than at its center. The resulting tapered pillow batt (otherwise produced in the same manner as illustrated for the non-tapered batt) is shown in FIG. 23.

In one typical construction the chute is 5 feet wide and 4 feet high. At the top there is a tapered hopper-like section 92 (FIG. 1). The bottom of the chute is, for example, about a foot above the apron, which may be of smooth-surfaced rubber. The inner surfaces of the chute are covered with plastic film (e.g., polyyethylene) and the sides of the chute (between the edges of the doors) are also covered with such film. The doors are straight and spaced, for example, 8 inches apart just below the hopper-like section 92. Best control of the cross-lapping operation has thus far been obtained by the use of a chute of tapered construction (see, for example, FIG. 5), with the spacing between the doors at the lower, exit, end of the chute being about 1 to 2 inches when the bottom of the chute is open. For the pillow-making operation illustrated in FIGS. 17–19, 22 and 23, in which a wad of material is collected between the doors, it is desirable to have more space between the doors at the lower end of the chute so as to permit free and rapid downward passage of that wad; in this case the doors may be parallel, spaced about 8 inches apart. In one typical pillow-making operation, the traverse movement of the bottom of the chute is about 14 inches and there are 64 complete back-and-forth traverses per minute (making a total traverse movement of about 150 feet per minute) while the web travels at the rate of 200 feet per minute. In another example of a pillow-making operation the speed of the rolls 11, 12 is about 260 feet per minute, the angle between the line of movement of the apron and the direction of traverse is 60°, the speed of the apron is 55 feet per minute, the total traverse cycle takes 20 seconds, during which the doors are closed for 3 seconds and then make 16 complete back-and-forth traverses, the tow used is polyethylene terephthalate of 150,000 total denier, 5 denier per filament, having an average of 12 crimps per inch and 30% crimp (i.e., ratio of straightened length to crimped length of the filament is 1.3:1).

By the use of this invention fine webs of considerable width (e.g., 50 inches) can be cross-lapped effectively and continuously for substantial periods of time at high speeds, using web delivery speeds of 600 feet per minute, 1,000 feet per minute or even higher. Generally the rate of deposition of the web material will be well over 100 feet per minute and more usually over 200 feet per minute.

In the finished pillows the weight of the batt will depend, of course, on the desired resilience and size of the pillow. For conventional sizes of pillows (e.g., pillows of area of about 500–600 square inches, such as a 20 inch by 26 inch pillow) the density of the batt before stuffing it into the tick may be, for example, in the range of about ½ to 1½ pounds per cubic foot. In stuffing it into the tick the batt is compressed. Its density may increase by a factor of up to about 2½ times.

The fine webs used as the feed material for making the batts in the preferred form of the invention may be produced from tows of crimped parallel continuous filaments by first opening the tow to disalign the crimps of adjacent filaments and then spreading the tow, preferably with an air-spreading device, to produce the fine web. For the making of pillows, the starting tow is preferably one whose filaments are of polyethylene terephthalate, but it is within the broad scope of the invention to use other filaments, such as those made of other polyesters (e.g., the polyesters of terephthalic acid and other glycols such as dimethylol cyclohexane), linear superpolyamides (such as nylon 6 or nylon 6,6), polyacrylonitrile and copolymers of acrylonitrile, olefinic polymers and copolymers, e.g., isotactic polypropylene, secondary cellulose acetate (of the usual acetyl content, e.g., about 54–55% calculated as acetic acid), other organic derivatives of cellulose such as esthers and/or ethers of cellulose, for example cellulose propionate and cellulose acetate propionate or the like, highly esterified cellulose containing less than 0.29 free hydroxyl groups per anhydroglucose unit such as cellulose tricetate, rayon (regenerated cellulose), etc. The number of filaments of the starting tow can vary within wide limits and may range up to as high as 1,000,000, with a denier per filament as high as 25, e.g., 1 to 20, preferably about 1–10. The number of crimps per inch of tow may range up to as high as about 80, but for most end products to be described herein about 3 to 30, preferably about 7 to 15, crimps per inch of starting tow are best.

The tow may be conveniently opened, to prepare it for the air spreading steps by subjecting it, while moving in a predetermined path, to a differential gripping action between a plurality of points spaced from one another both longitudinally and transversely of the path, so that certain laterally spaced sections of the tow are positively gripped relative to other laterally spaced sections of the tow, alternating with the said gripped sections, which are not gripped at all or are gripped at different relative points. In this manner there is produced, as a function of the differential positive gripping of the tow, a relative shifting of adjacent filaments longitudinally of the tow, whereby the crimps are moved out of registry with one another. Preferably, although not necessarily, the differential gripping action is such that a relative lateral displacement between adjacent filaments of the two is also effected, so that the combination of two transverse filament movements brings about the complete opening of the tow.

The differential gripping action may be achieved by the provision of at least one pair of rolls, one of which is smooth-surfaced and the other of which is grooved over its entire periphery; if desired, there may be a plurality of such pairs of rolls arranged in tandem. On each grooved roll, the grooves and the ridges alternating therewith may extend obliquely or helically in opposite senses from its center to its opposite ends. Thus, when the tow passes between the two rolls of any given pair of one grooved and one smooth-surfaced roll, some of the tow sections are gripped between the peaks of the ridges of the grooved roll and the outer peripheral surface of the opposed smooth-surfaced roll, while other sections of the tow which are at that time located in registry with the spaces between the ridges of the grooved roll are not gripped between the latter and the smooth-surfaced roll. Generally only one roll of each pair is positively driven while the other is yieldably biased towarad it and rotates due to the passing of the tow between the rolls.

The tow-opening process is illustrated in U.S. Pat. Nos. 3,156,016 and 3,032,829.

In the preferred method of spreading, the tow is passed through an air spreader in which the moving tow, in flattened condition, is confined between parallel walls while streams of air or other suitable gas are directed at the tow across its full width. Advantageously, the air spreading is effected in a plurality of stages in each of which the tow is spread to a greater width than in the preceding stage. For best results the tow in any one stage is isolated from the effect of the following stage as by passing the tow between stages firmly in contact with a surface moving at a controlled rate, e.g., around and between a pair of driven nip-defining rolls.

By air spreading it is possible to spread the tow readily, and very evenly, to great widths to produce webs of extreme fineness, such as webs containing less than about 500, e.g., 100 filaments per inch of width, and in which the average air space per fil is appreciably greater than the diameter of the filaments. The average air space per fil is the average space between the filaments of the web measured on a line in the plane of the web, perpendicular to the longitudinal direction of the filaments of the web, said space being calculated on the assumption that all the filaments are arranged in a single plane, with no filaments crossing other filaments. It may be calculated simply from a knowledge of the average diameter of the filaments ($D_f$), the width ($w$) of the substantially uniform web and the number of filaments ($n$) in said width, according to the formula: Average Air Space Per Fil = $(w - nD_f) \div n$.

Preferably the average air space per fil has a positive value, most preferably several times (e.g., 2, 5, 10 or more times) as great as the average filament diameter, and the density of the web is at most about one ounce per square yard and most preferably well below one ounce per square yard, e.g., one-tenth to one-fourth or one-half ounce per square yard.

The air spreaders themselves advantageously have air-delivery slits or other suitable openings in one or both of the parallel walls between which the tow passes, said slits leading from a plenum chamber supplied with air at constant pressure. In one highly effective construction there are a series of slits, each running in a direction transverse to the direction of movement of the tow and so arranged that all portions of the tow are subjected to the air streams from said slits. It has been found that even when the width of the air spreader is 8 feet or more, the tow spreads uniformly and the outer edges of the tow, where the resistance to the air would be expected to be less, attain substantially the same density as the central portions of the tow.

The pressure in the plenum chamber may vary, one suitable range being about 1 to 5 psig; higher pressures may be used, e.g., 100 psig, but these are economically wasteful. The pressure in the tow-confining zone, between the parallel walls, is believed to be a little less than atmospheric. When the air is blown straight at the face of the web, the air generally leaves the tow-confining zone from both ends of said zone. Little air is needed to expand the tow. Despite the fineness of the webs, the walls of the tow-confining zones of the air spreaders need not be correspondingly close together; thus very good results have been obtained with tow-confining slots one-tenth inch in width.

In the preferred fine webs all the continuous filaments are substantially parallel; that is, they run in the same general direction, lengthwise of the web. However, when one does not look at the whole of the long length of any particular filament, but looks instead at the individual crimps thereof, it will be seen that most portions of the filament do not run in this general lengthwise direction but instead zigzag back-and-forth across such general direction. The amplitude of the crimps is such that, for any particular filament, the portion of the crimp at one side (hereafter termed the "crest" of the crimp) overlaps one or more neighboring filaments while the portion of the crimp at the other side (hereafter termed the "valley" of the crimp) overlaps one or more of its neighboring filaments on said other side. This overlap helps to give the webs their cohesiveness. For example, the filaments in the web may have a crimp whose amplitude (from a median line running in the same direction as the filament) is in the range of about 1/128 to 3/16 inch, said amplitude being measured from said median line to the top of a crest, or to the bottom of a valley. Since there may, for example, be several hundred filaments per inch of web width and since the crimps are not in registry, there will be considerable overlapping of filaments in the web.

When one turns from an examination of the crimps and takes a somewhat larger, though still relatively short, view of the portion of any particular filament which contains several crimps, and which may be for example one-half inch to several inches long, it will be found that these portions are not perfectly parallel to the longitudinal direction of the web, but make small angles therewith, which angles change in direction and magnitude along the length of the filament; generally these angles are less than 20°, although for very short portions (e.g., one half inch long) the angle may be larger at times.

It is believed that the overlapping of the crimps and the overlapping due to the presence of the angularly disposed short portions, just described, contribute to the cohesiveness of the web so that, despite its fineness, it can be readily handled as a unitary structure. The degree to which the individual filaments meander by virtue of the presence of said crimps and angularly disposed short portions is not, however, very great; typically, the ratio of the straightened lengths of the individual filaments to the lengths of the same filaments in the web is less than about 1½:1 and, preferably, greater than 1.1:1, e.g., about 1.2:1 to 1.4:1. This ratio may be measured by cutting a predetermined length of the web, removing the individual filaments of the cut portion and measuring their lengths while under a tension just sufficient to remove the crimp; the results are then expressed as the ratio between the measured lengths of the individual filaments and said predetermined cut length.

In specifying denier per filament and total denier, the number given herein, with respect to tows and webs, is the denier for the filaments prior to crimping, i.e., the weight of 9,000 meters of straight filaments; the weight of 9,000 meters of crimped, unstraightened filaments or tow will naturally be greater than these values.

The fine webs are quite susceptible to snagging of individual continuous filaments, particularly when the latter are of relatively strong material such as polyethylene terephthalate. The previously described air cushion resulting from the operation of the chute helps to avoid such snagging, especially when the chute doors and their edges have smooth plastic surfaces as described above.

It is to be understood that the foregoing description is given merely by way of illustration, and that variations may be made therein without departing from the spirit of this invention.

The embodiments of the invention in which an exclusive property or privilege is claimed are defined as follows:

1. Apparatus for the manufacture of cross-lapped structures comprising means for continuously supplying a longitudinally moving wide fine web of substantially parallel filaments at a predetermined linear speed, a support, means for traversing said web by alternately moving the web in opposite direction across said support to deposit the web in folded condition on said support, said traversing means including an oscillating chute for receiving the moving web and discharging said web onto said support, said chute comprising opposed wide panels with inner walls having smooth surfaces separated by a distance substantially greater than the thickness of said web, said panels converging toward an exit, means for oscillating said chute at a predetermined rate to provide a predetermined linear speed of traverse of said exit substantially lower than the linear speed of said web, said exit being spaced from said support sufficiently for said web, in travelling from said exit to said support, to billow outward substantially beyond the limits of the traverse of said exit, and baffle means associated with said chute to regulate and direct the currents of air generated by the oscillation of said chute to control the billowing effect.

* * * * *